May 19, 1925.
C. A. ALDEN
1,537,931
RAIL JOINT
Filed Jan. 26, 1923     2 Sheets-Sheet 1
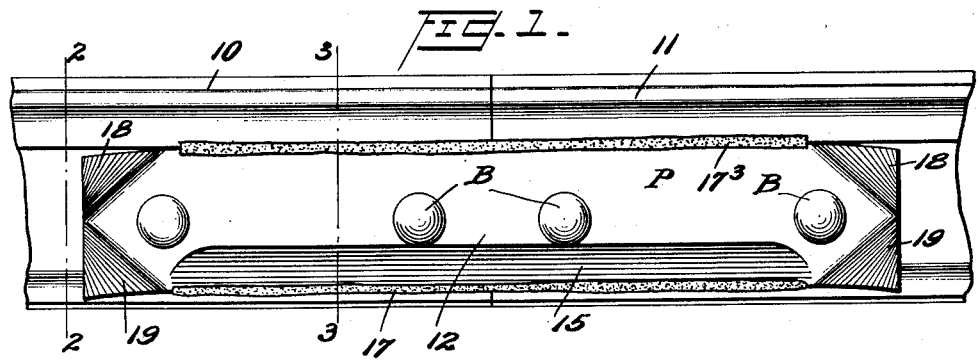
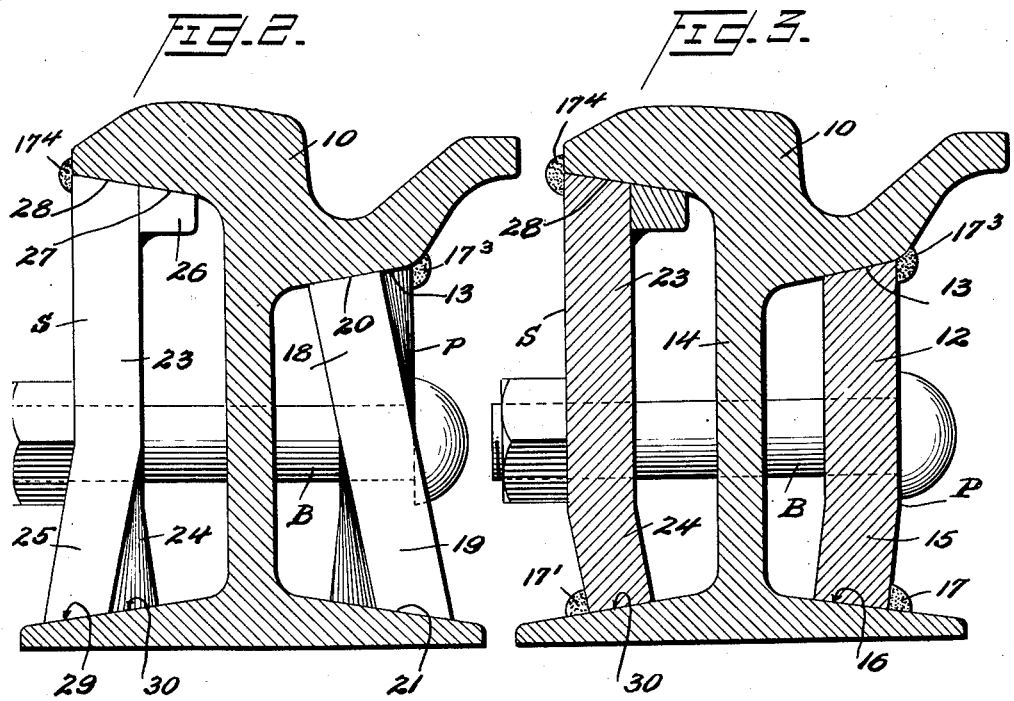
Inventor
Charles A. Alden,
By Watson, Coit, Morse & Grindle,
Attorneys.

May 19, 1925. 1,537,931
C. A. ALDEN
RAIL JOINT
Filed Jan. 26, 1923  2 Sheets-Sheet 2
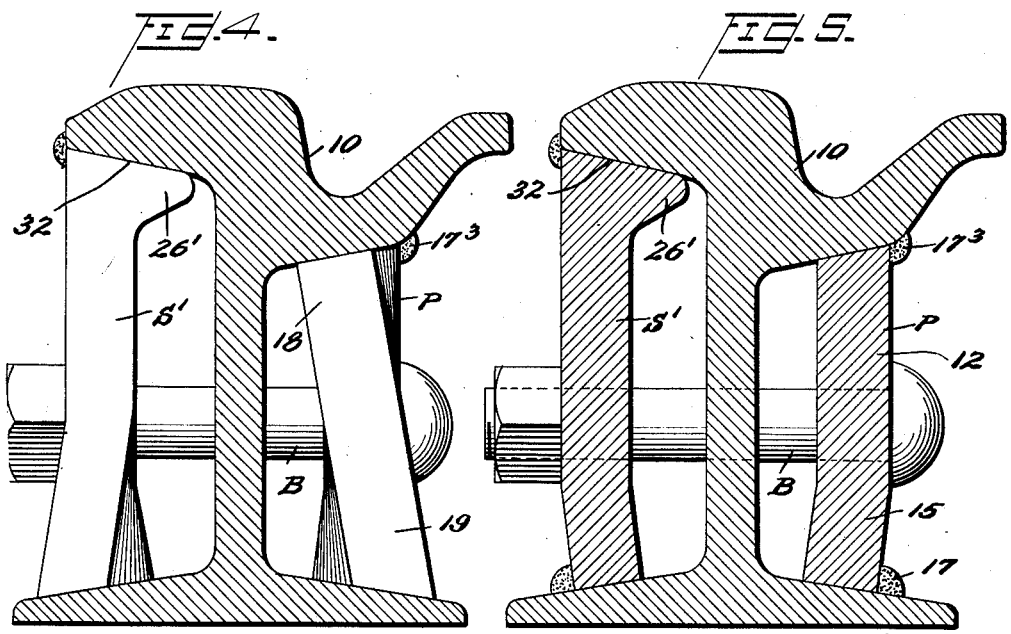
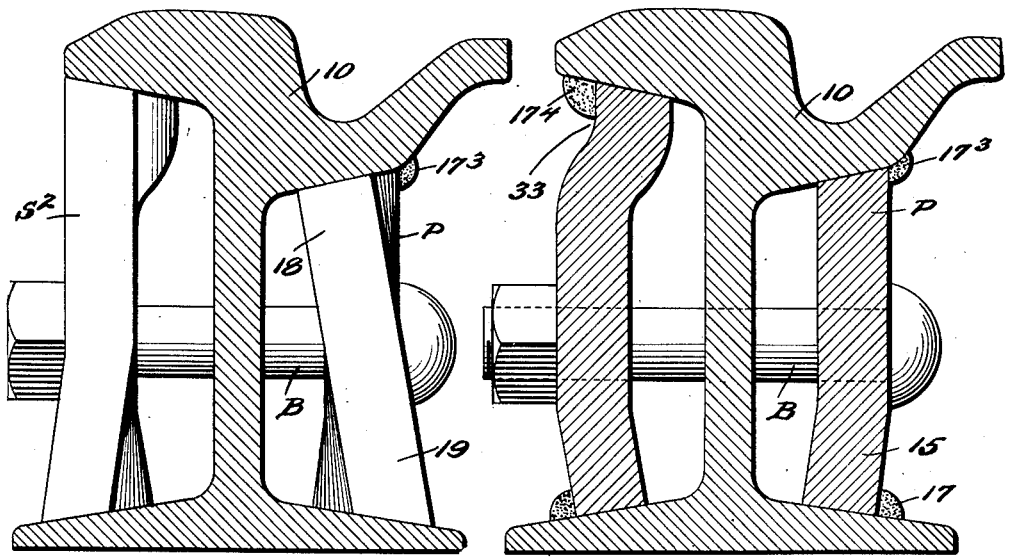

Patented May 19, 1925.

1,537,931

UNITED STATES PATENT OFFICE.

CHARLES A. ALDEN, OF STEELTON, PENNSYLVANIA.

RAIL JOINT.

Application filed January 26, 1923. Serial No. 615,170.

*To all whom it may concern:*

Be it known that I, CHARLES A. ALDEN, a citizen of the United States, residing at Steelton, county of Dauphin, and State of Pennsylvania, have invented certain new and useful Improvements in Rail Joints, of which the following is a specification.

The present invention relates to rail joints and particularly to rail joints in which the abutting rail ends are secured together by splice plates welded thereto or secured in position by bolts and by welding.

It is important that splice plates which are designed to be welded to the rail ends be of the self-centering type and also so formed that the weld between the lower edge of the splice plate and the base of the rail be as remote as possible from the outer edge of the rail base. By a self-centering splice plate is meant one which will not tilt when being drawn into position by bolts and which will maintain, in the assembling operation, a position substantially parallel to the web of the rail. The advantage in having the splice plate so formed that the weld between the same and the base of the rail is as close to the web as possible, and as remote from the edge of the base as possible flows from the fact that the intense heat of welding is injurious to the rails and particularly to the base flanges where the welds are close to the edges thereof, due to the thinness of the metal at the edge. As the rail web is approached, the base flange thickness increases, and it is less probable that the base flange will be weakened by the welding heat so that its outer margins will be broken off under the shock and vibration resulting from traffic.

In connection with the manufacture of splice bars for rail joints, particularly with respect to bars of the type adapted to be welded to rail heads and flanges, it is important that the bars shall not only be easily centered, as above set forth, but also it is highly desirable that such bars shall be capable of manufacture in such a way that the greatest strength may be had for the amount of material used in manufacture. To this end, therefore, I have provided a splice bar in which the limits of the upper and the lower bearing surfaces are effectively widened without involving the presence of extensive flange portions, the lower portion of the bar being warped to provide a suitably wide bearing area and the upper widened surface being provided by either distortion of the upper portion of the bar or such surface may be widened by welding or rolling an inward extension thereto. In view of the fact that, in so far as self-centering of the bar is concerned, the length of the upper inward extension is immaterial and in view of the further fact that the inward extension exerts its greatest effect in strengthening the joint in the vicinity of meeting rail ends, I prefer to provide a splice bar with an upper inward extension which does not extend throughout the length of the bar, in order that the structure may be simplified from the standpoints of construction and application and be relatively strong for the amount of metal used.

In the accompanying drawings several forms of splice plates are illustrated which are constructed in accordance with my present invention, the plates being of the self-centering type and formed in such manner that the lower welds are relatively remote from the edges of the base flanges of the rails while at the same time each plate taken either alone or in combination with the welding material, substantially supports the head of the rail. At the same time the plate is of great simplicity and may be fabricated in a minimum of time and with a minimum of expense.

In the drawings:

Fig. 1 is a side elevation of a rail joint having the improved plates incorporated therewith;

Fig. 2 is a section on line 2—2 of Fig. 1;
Fig. 3 is a section on line 3—3 of Fig. 1;
Figs. 4 and 5 are views similar to Figs. 2 and 3 but showing a modified form of one of the plates;

Figs. 6 and 7 are views similar to Figs. 2 and 3 but showing a still further modified embodiment of the invention, in which sufficient welding material is used as to materially increase the effect in rail head support.

The abutting rail ends are indicated at 10 and 11 respectively and the splice plates, referring now to the form illustrated in Figs. 1, 2 and 3, at S and P respectively. Referring particularly to the plate P it will be seen that the main portion 12 of this plate is flat and has an inwardly and downwardly inclined upper edge guide surface 13 adapted to abut against the correspondingly inclined under-surface of the rail head. Portion 12 of the plate lies parallel to the web 14 of the rail. The lower edge portion of the plate, indicated by the numeral 15, makes an angle with the main portion 12, as shown in Fig. 3, this portion being downwardly and inwardly inclined and provided with an upwardly and inwardly inclined lower edge surface 16 to bear against the upwardly and inwardly inclined upper surface of the rail base.

The lower weld is indicated at 17 and it will be seen that by inwardly and downwardly inclining the lower portion of the plate this weld is brought closer to the web of the rail than would be the case were the plate all in one plane. The corners of the plate are inclined to the main portion, as illustrated in Fig. 2. The upper corners 18 are inwardly inclined and the lower corners 19 are outwardly inclined. The upper corners are provided with guiding or bearing surfaces 20 in the same plane as the guide surfaces 13 of the main portion 12 and the lower corners are provided with guide surfaces 21 in the same plane as the guide surfaces 16. As a result, by displacing the corners of the plates in this manner the effective widths of the edge guide surfaces are increased, and the plate rendered more certainly self-centering.

The plate S is formed somewhat similarly to the plate P, having a main flat portion 23 adapted to lie parallel to the web 14 of the rail, inwardly inclined lower portion 24, and outwardly inclined lower corners 25. Instead of providing inwardly inclined upper corners, however, a metallic strip 26 is welded to the inner upper surface of the plate and the upper surface 27 of this member and the upper edge surface 28 of the plate form a continuous inwardly and downwardly inclined guide surface to abut against the corresponding surface of the rail head. The strip 26 is preferably shorter than the bar to which it is welded, it being primarily intended not only to serve to effectively increase the upper guiding surface but also to make possible the interposition of more material in the vicinity of the adjacent rail ends, whereby the strengthening of the joint is increased where most required. The lower edge surface 29 of the corner 25 lies in the same plane as the lower edge surface 30 of the inclined portion 24, and the surfaces 29 and 30 together constitute the lower guide surfaces of the plate.

In assembling, the bolts B are utilized to draw the plates into the positions in which they are illustrated and to secure them in such positions, while the welding material indicated at 17, 17¹, 17³ and 17⁴ is added. The rail joint thus formed is strong and well able to withstand the shock of traffic. In Figs. 4 and 5 the splice plate P illustrated is similar to the corresponding plate shown in Figs. 1, 2 and 3 but splice plate S' is somewhat different from splice plate S, having a portion 26' integral therewith to form an inwardly projecting flange along its upper surface, instead of having a strip welded thereto as in the form just described. The plates S and S' are similar in other respects and function in the same manner, the upper inclined surface 32 of plate S' being coextensive in area with the two upper inclined surfaces 27 and 28 of plate S.

In Figs. 6 and 7 the plate P is again similar to the corresponding plate illustrated in Figs. 1, 2 and 3 but the plate S² is somewhat differently formed. Here the upper margin of this plate is pressed inwardly, as shown, leaving an external depression 33 at its top edge and intermediate the ends. Into this depression the welding material 17⁴ may be placed.

The plates may be fabricated at minimum expense by casting, forging, or rolling followed by bending operations, as will be apparent to one skilled in the art, and rail joints formed will have a maximum strength for a minimum weight of metal. It will be seen that with each form of plate not only is the lower weld relatively remote from the edge of the rail base but the head of the rail is adequately supported against the shocks of traffic. Minor changes may be made in the form of the plates without departing from the spirit of the invention.

Having thus described my invention what I claim as new and desire to secure by Letters Patent is:

1. A self centering splice plate for a rail joint having upper and lower guide surfaces adapted to bear against the heads and bases respectively of abutting rail ends, having a main portion adapted to lie parallel to the web of a rail, a lower edge portion inclined inwardly relatively to the main portion, and lower corner portions inclined outwardly relatively to the main portion, the lower edge surfaces of the lower corner portions being adapted to bear against the bases of the rail ends.

2. A self-centering splice plate for a rail joint having upper and lower guide or bearing surfaces, adapted to bear against the heads and bases respectively of abutting rail ends, a main portion adapted to lie parallel to the web of a rail, a lower edge portion inclined inwardly relatively to the main portion, and lower corner portions inclined outwardly relatively to the main portion, and the upper edge of the main portion having a bearing surface of greater effective width than the thickness of the upper portion taken parallel to the bearing surface.

3. A splice plate for a rail joint having a strip welded to its inner surface adjacent the upper edge thereof, said strip having its upper surface adapted to bear against the under surface of a rail head, for the purpose set forth.

4. A built up splice plate of the class described having a main portion provided with upper and lower surfaces to abut against the heads and bases respectively of abutting rail ends and a metallic strip secured to said main portion adjacent its upper edge and provided with an upper surface to bear against the heads of the abutting rails.

5. A built up splice plate of the class described having a main portion provided with upper and lower surfaces to abut against the heads and bases respectively of abutting rail ends and a metallic strip secured to said main portion adjacent one of its edges and having a surface to bear against the abutting rail ends, for the purpose set forth.

6. A splice plate comprising two parallel members rigidly secured together, one of said members having surfaces to bear against the heads and bases respectively of abutting rail ends and the second member having a single such bearing surface which is continuous with one of the bearing surfaces of said first member, for the purpose set forth.

7. A splice bar for rail joints consisting of a plate member having upper and lower bearing surfaces adapted to bear against heads and flanges of abutting rail ends, the upper portion of the plate being disposed entirely within the plane of its outer surface and the intermediate portion of the upper bearing surface extending inwardly leaving terminal portions disposed outwardly effectively with respect to the intermediate portion, whereby the bar may have its effectiveness increased in the vicinity of adjacent rail ends.

8. A splice bar for rail joints consisting of a plate member having upper and lower bearing surfaces adapted to bear against heads and flanges of abutting rail ends, the upper portion of said plate being adapted to be disposed parallel to rail webs and the upper bearing surfaces being entirely within the plane of the outer surface of the upper portion with the inner and outer limits of the upper bearing surface being further apart than the thickness of the plate measured parallel to the upper bearing surface and the lower portion of the plate extending inwardly with the exception of the lower corners, whereby the inner and outer limits of the lower bearing surface are increased.

9. In a rail joint the combination, with a pair of abutting rail ends, of a splice bar consisting of a plate member having upper and lower bearing surfaces bearing against heads and flanges of the abutting rail ends, the upper portion of said plate being disposed substantially parallel to the rail webs and the upper bearing surface being entirely within the plane of the outer surface of the upper portion with the inner and outer limits of the upper bearing surface disposed further apart than the thickness of the plate measured parallel to the upper bearing surface and the lower portion of the plate extending inwardly with the exception of the corners, whereby the inner and outer limits of the lower bearing surface are increased, and welds between the upper and lower outside face portions of the plate and the heads and flanges, respectively, said welds being disposed oppositely to portions of the upper and lower bearing surfaces extending furthest toward rail webs.

In testimony whereof I hereunto affix my signature.

CHARLES A. ALDEN.